R. LANDSTROM.
Lining to Coffee Roasters.
No. 27,454.
Patented March 13, 1860.
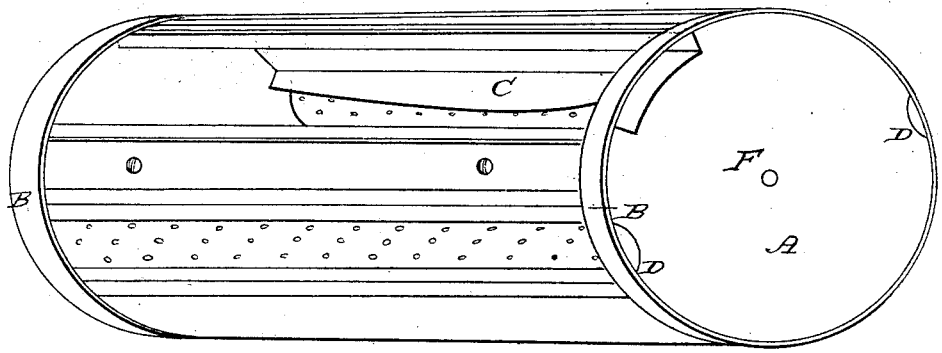
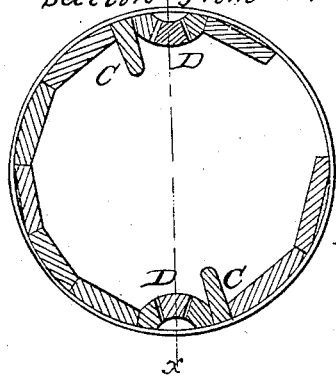
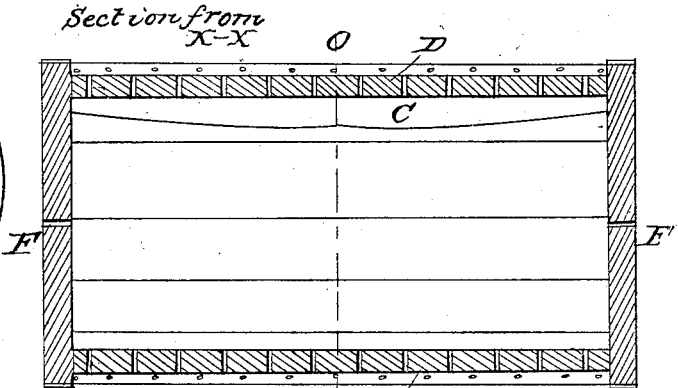
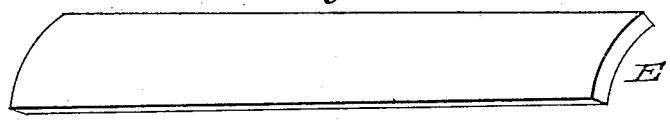
Sliding Door
Witnesses
Noah Davis
W. R. Davis.
Inventor
Reinhold Landstrom

UNITED STATES PATENT OFFICE.

REINHOLD LANDSTROM, OF BOSTON, MASSACHUSETTS.

COFFEE-ROASTER.

Specification of Letters Patent No. 27,454, dated March 13, 1860.

*To all whom it may concern:*

Be it known that I, REINHOLD LANDSTROM, of Boston, in the county of Suffolk and State of Massachusetts, have invented a new and useful Lining for Coffee-Roasters; and I do hereby declare that the following is a full, clear, and exact description of the construction and operation of the same, reference being had to the accompanying drawings and to the letters of reference marked thereon.

The nature of my invention consists in an independent lining of stone and a metallic frame so constructed as to be applied to metallic coffee roasters, by which lining the oil of the coffee roasted therein is properly developed and the aroma saved.

My invention further consists in the mode of making the bars or the staves containing the holes for the escape of steam.

I construct this lining of several pieces or staves fitted together in the shape of a cylinder as shown at A in the accompanying drawing; and surround it with iron hoops B, which I connect by three or any other suitable number of bars of metal, so as to form a metallic frame. I insert two flanches C on the inside of the cylinder and provide the cylinder with a sufficient number of holes intended to allow the moisture or steam to escape, thereby securing it from all danger of explosion. These holes are made in concavo convex staves D, D, or in a stave having its outer surface channeled or grooved from end to end in order that such channel with the usual metallic case of the roaster may serve as a passage to carry off the steam, it escaping through the ends of the passage. By so making the roaster the gas from the coal or fuel that may be used to heat it cannot enter the roaster through the steam escape passages, and thus the coffee while being roasted is preserved from the injurious action of the smoke and gases of the furnace.

Heads F, F, are to be used with the staves and frame and should be made of soap stone or its equivalent and may be formed with holes or passages through their centers for the reception of the shaft of the roaster. There should be an opening in the side of the roaster as shown in the drawings, the same being provided with a sliding stave or door E. Through this opening the coffee may be either supplied to or be removed from the roaster.

I claim—

1. Constructing the lining of a coffee roaster of staves or pieces and heads of soap stone and a metallic frame applied together substantially as described.

2. And I also claim the mode of making each bar or stave provided with steam escape holes, viz. with a channeled or grooved external surface so as to form with the outer case of the roaster, a steam passage open at the ends of the stave and to be so covered by the outer case that the coffee may be protected from the smoke and gases of the furnace as specified.

REINHOLD LANDSTROM.

Witnesses:
NOAH DAVIS,
W. R. DAVIS.